(12) United States Patent
Porche, Jr.

(10) Patent No.: US 10,131,499 B1
(45) Date of Patent: Nov. 20, 2018

(54) UNIVERSAL HANDLE APPARATUS (71) Applicant: Joseph Merrial Porche, Jr., Metairie, LA (US)

(72) Inventor: Joseph Merrial Porche, Jr., Metairie, LA (US)

( * ) Notice: Subject to any disclaimer, the term of this patent is extended or adjusted under 35 U.S.C. 154(b) by 0 days.

(21) Appl. No.: 15/639,848

(22) Filed: Jun. 30, 2017

Related U.S. Application Data (60) Provisional application No. 62/357,744, filed on Jul. 1, 2016.

(51) Int. Cl.
*B65G 7/12* (2006.01)

(52) U.S. Cl.
CPC ...................... *B65G 7/12* (2013.01)

(58) Field of Classification Search
CPC ........................................................ B65G 7/12
USPC ....... 294/137, 142, 152, 153, 154, 155, 156, 294/158, 159, 165; 16/422, 426, 430
See application file for complete search history.

(56) References Cited

U.S. PATENT DOCUMENTS

| | | | |
|---|---|---|---|
| 3,175,806 A | 3/1965 | Prete, Jr. | |
| 3,211,489 A * | 10/1965 | Gill | F16L 1/06 294/152 |
| 3,484,894 A | 12/1969 | Fletcher | |
| D250,630 S * | 12/1978 | Allegretti | D8/107 |
| 5,184,862 A * | 2/1993 | Theobald | B65G 7/12 16/422 |
| 5,695,234 A * | 12/1997 | Coticchio | A45F 5/1026 294/152 |
| 5,813,504 A | 9/1998 | Iny et al. | |
| 5,951,080 A * | 9/1999 | Wessner | A01M 31/00 294/150 |
| 6,062,619 A * | 5/2000 | Clark, Jr. | A01B 1/026 16/426 |
| 6,129,399 A * | 10/2000 | Burch, Sr. | A01M 31/00 294/150 |
| 6,193,290 B1 * | 2/2001 | Barbara, Jr. | B61G 7/00 294/15 |
| 6,386,588 B1 | 5/2002 | Young et al. | |
| 6,687,964 B2 | 2/2004 | Vanderpool | |
| 7,390,042 B1 * | 6/2008 | Miller | B65G 7/12 294/150 |
| 8,616,597 B2 * | 12/2013 | Guerra | A01B 1/026 294/57 |
| 2013/0113228 A1 * | 5/2013 | Gieseke | B65G 7/12 294/137 |

(Continued)

*Primary Examiner* — Paul T Chin
(74) *Attorney, Agent, or Firm* — Garvey, Smith & Nehrbass, Patent Attorneys, L.L.C.; Seth M. Nehrbass; Julie Rabalais Chauvin (57) ABSTRACT

A handle for pulling or lifting an object includes a handle having a first section with a gripping surface, a second section spaced from the first section and side sections that each connect between the first and second sections on opposing sides of a handle central open area; a pair of lugs mounted on said second section and extending away from said central opening area spaced inwardly of said side sections, wherein each lug has a lug free end and a lug base joined to the second section; each lug having an open ended transverse opening that includes a cylindrical section and a groove extending radially away from the cylindrical section; and a removable locking pin that is connectable to the lugs by occupying the lug openings in a connected locking position.

20 Claims, 12 Drawing Sheets

(56) References Cited

U.S. PATENT DOCUMENTS

2015/0246774 A1\* 9/2015 Fernandes ................ B65G 7/12
414/800

\* cited by examiner

UNIVERSAL HANDLE APPARATUS

CROSS-REFERENCE TO RELATED APPLICATIONS

Priority of my U.S. Provisional Patent Application Ser. No. 62/357,744, filed 1 Jul. 2016, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the field of a simple tool. More particularly, the present invention relates to an accessory handle.

2. General Background of the Invention

The present invention relates to a universal handle.
The following patent references are incorporated herein by reference:
U.S. Pat. Nos. 3,175,806; 3,484,894; 5,813,504; 6,129,399; 6,386,588; and 6,687,964.

BRIEF SUMMARY OF THE INVENTION

The present invention comprises a simple tool which acts as a universal handle. More particularly, the present invention comprises an accessory handle with a unique insertion peg that locks, and the peg can be easily removed. The universal handle of the present invention provides a unique multi-use application by the end user that is simple, practical, and efficient.

The present invention relates to a universal handle. The present invention includes a multi-purpose, multi-use handle with a unique peg part that can be easily inserted and removed for quick and easy attachment to things by the end user. More particularly, the present invention relates to an accessory handle which can be used for, but not limited to: restraining, pulling, toting, carrying, tugging, lifting, balancing, and dragging. Examples of use include, but are not limited to: attachment to dog leashes, ropes (by end loops, mid loops, hitches, slide/grip knots), webbing, cables, hooks, carabiners, custom-made objects and equipment, and can be used as a replacement part for defective or broken products (i.e. replacement for a broken ice chest handle).

The apparatus of the present invention, a universal handle apparatus, includes a preferably ergonomically designed handle preferably with two attached peg legs incorporated into the handle. The peg legs preferably have channeled openings matching a geometrically designed peg for easy insertion that preferably may be turned to lock the peg as a part of the handle. The peg preferably can be twisted to align with a geometrically designed channel that would allow for easy removal of the peg. This unique feature will allow the universal handle of the present invention to be used as an accessory for multiple applications. The geometrically designed channel peg leg and peg pair can be made with single or multiple channels in variable sizes and shapes. Preferably the various sizes and shapes allow for more or less force to be needed to remove the peg once it has been secured. A unique utility of the present invention is to allow for easy installation and removal of the peg for multipurpose use as desired by the end user. There is a long-felt need for such a universal handle.

BRIEF DESCRIPTION OF THE SEVERAL VIEWS OF THE DRAWINGS

For a further understanding of the nature, objects, and advantages of the present invention, "Universal Handle", reference should be had to the following detailed description, read in conjunction with the following drawings, wherein like reference numerals denote like elements and wherein.

DETAILED DESCRIPTION OF THE INVENTION

Figure 1:
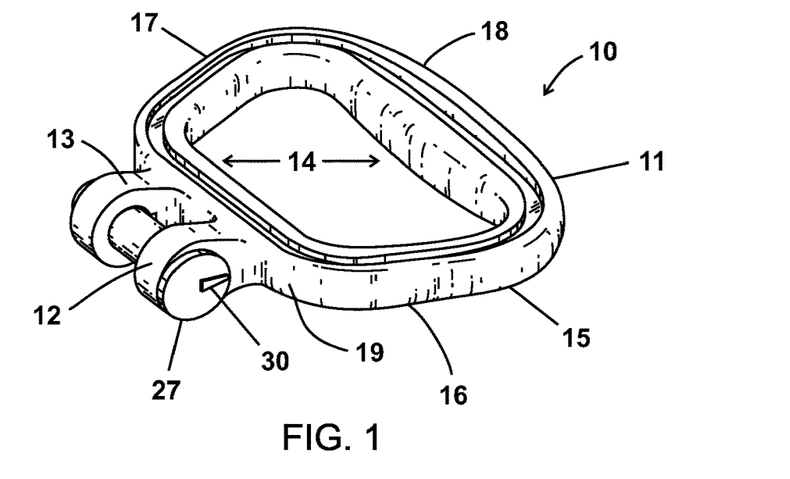
FIG. 1 is a perspective top view of a preferred embodiment of the apparatus of the present invention.
Figure 2:
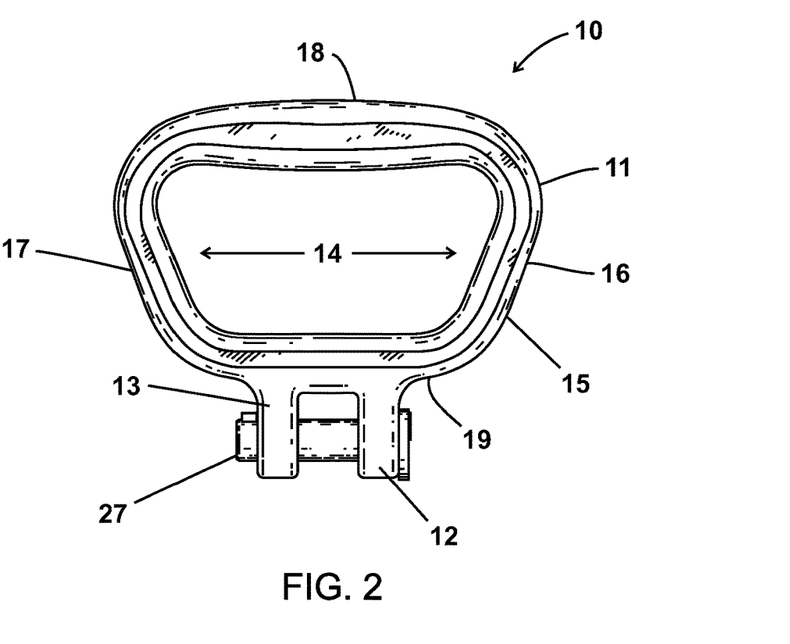
FIG. 2 is a top view of a preferred embodiment of the apparatus of the present invention.
Figure 3:
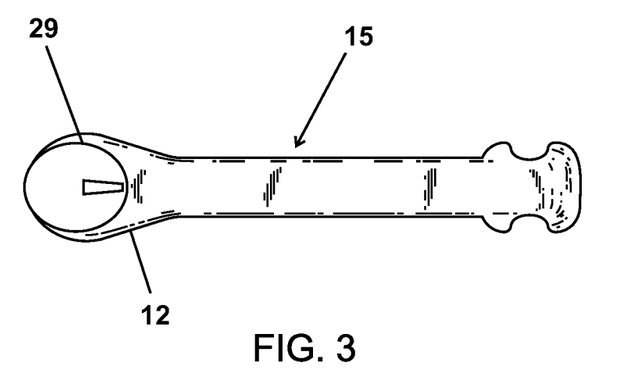
FIG. 3 is a right side view of a preferred embodiment of the apparatus of the present invention.
Figure 4:
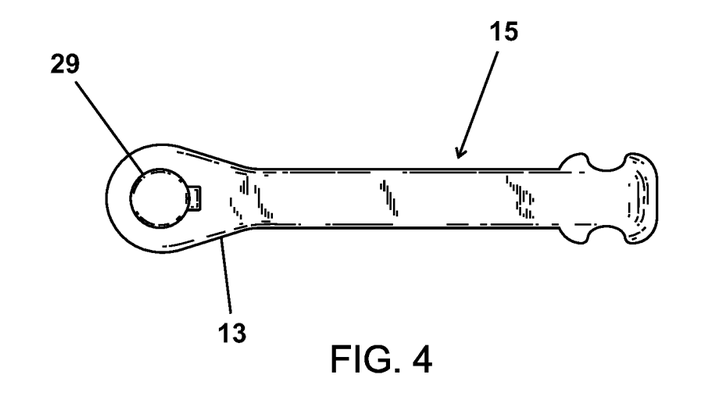
FIG. 4 is a left side view of a more preferred embodiment of the apparatus of the present invention.

FIGS. 1-25 show a preferred embodiment of the apparatus of the present invention, designated generally by the numeral 10 in FIG. 1. Apparatus 10 of the present invention includes a handle and strap arrangement of improved configuration wherein a user is able to attach a selected strap of a selected length to a handle and lock the strap in place with a locking peg or pin that interfaces and interlocks with a pair of spaced apart lugs on the handle.

Handle 11 has lugs 12, 13. Lug 12 and 13 are preferably symmetrical and the mirror image of each other. Lugs 12, 13 can be integrally connected to handle 11 such as a one-piece construction of injection-molded plastic or machined metal or cast metal. Handle 11 can have large or long section 18, small or short section 19, and side sections 16, 17. The sections 16, 17, 18, 19 surround a central opening or central open area 14. Long section 18 provides a gripping surface 15 for grasping by a user's hand. Central opening or central open area 14 can be generally trapezoidally shaped as shown.

Figure 12:
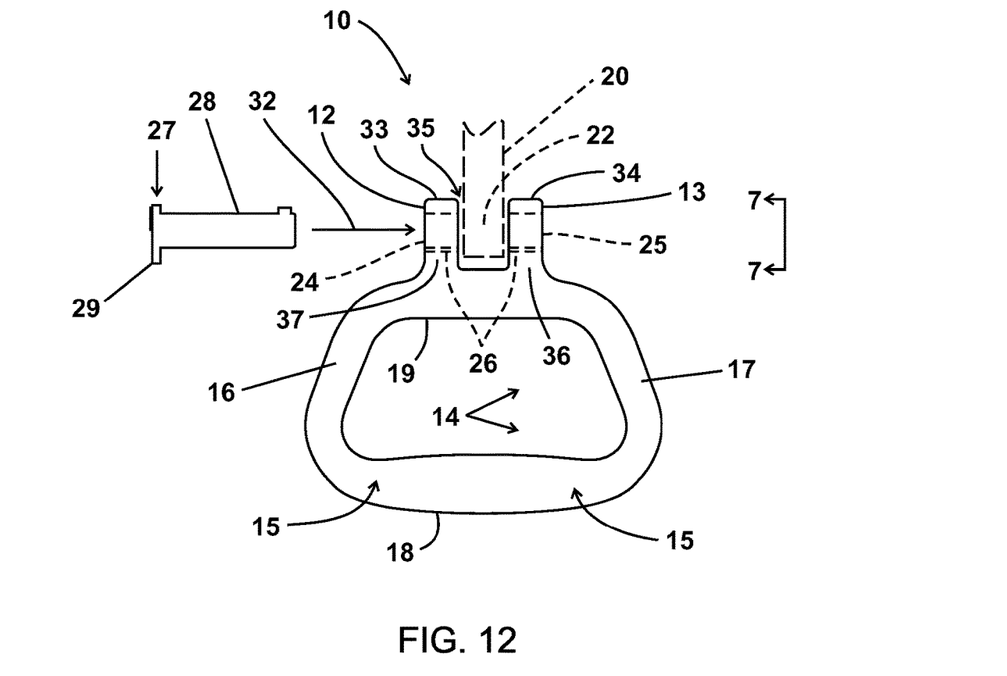
FIG. 12 shows the handle of a preferred embodiment of the present invention being attached to for example a nylon webbing strap as an example of one of the uses of a preferred embodiment of the apparatus of the present invention.
Figure 13:
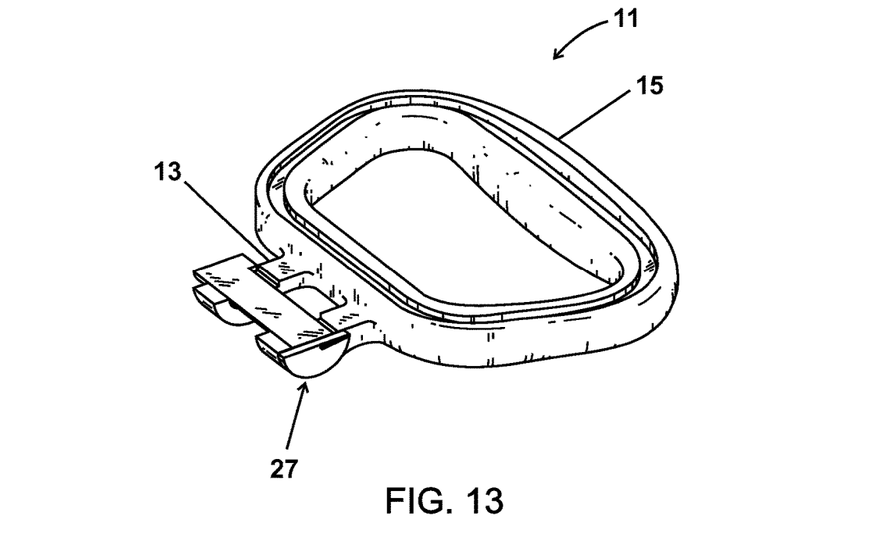
FIG. 13 is a partially cut-away view of a pin and lugs of the handle of a preferred embodiment of the present invention.

Each lug has a lug free end spaced away from the handle small section 19 as seen in for example FIG. 1. Lug 12 has lug free end 33 and lug 13 has lug free end 34 as seen in FIG. 12. If a metal handle 11 is provided, lugs 12, 13 can for example be welded to short or small section 19 at lug base 35, 36. A gap 35 is provided in between lugs 12, 13. Gap 35 thus spans from one lug 12 to the other lug 13 and from small or short section 19 of handle 11 to the lug free ends 33, 34.

A strap 20 can be connected to handle 11 at gap 35 using a specially configured locking pin or peg 27. Peg or pin 27 connects to both lugs 12, 13 at lug openings or channels 24, 25. The pin or peg 27 is long enough to extend through both lugs 12, 13 when inserted through both lug openings or channels 24, 25 as illustrated by arrow 32 in for example FIG. 1.

Figure 16:
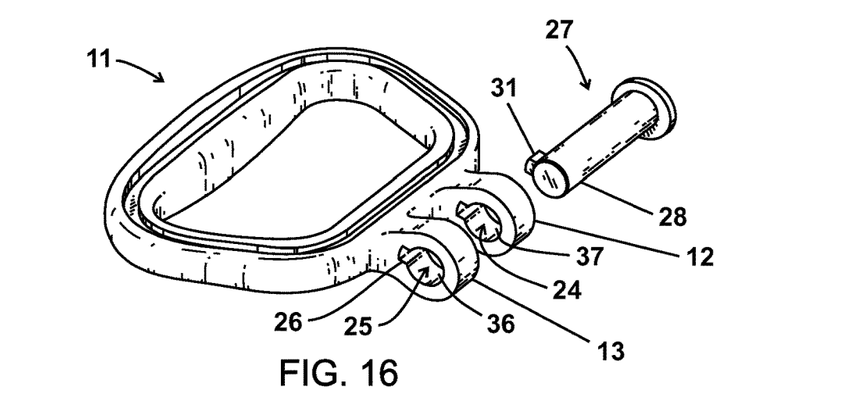
FIGS. 16-18 show the process of inserting the pin through the lugs and twisting the pin to lock the pin in place, with the curved arrow in FIG. 18 indicating the twisting motion.

Each lug opening or channel has a generally cylindrically shaped section 36 or 37 and a groove 26 that extends radially away from the cylindrically shaped section 36 or 37 as seen in for example FIG. 16. Pin or peg 27 has a shaft 28 that can be cylindrically shaped and sized to fit the cylindrical section 36 or 37 of a lug opening 24 or 25.

Figures 5, 6, 7, 8, 9, 10, 11:
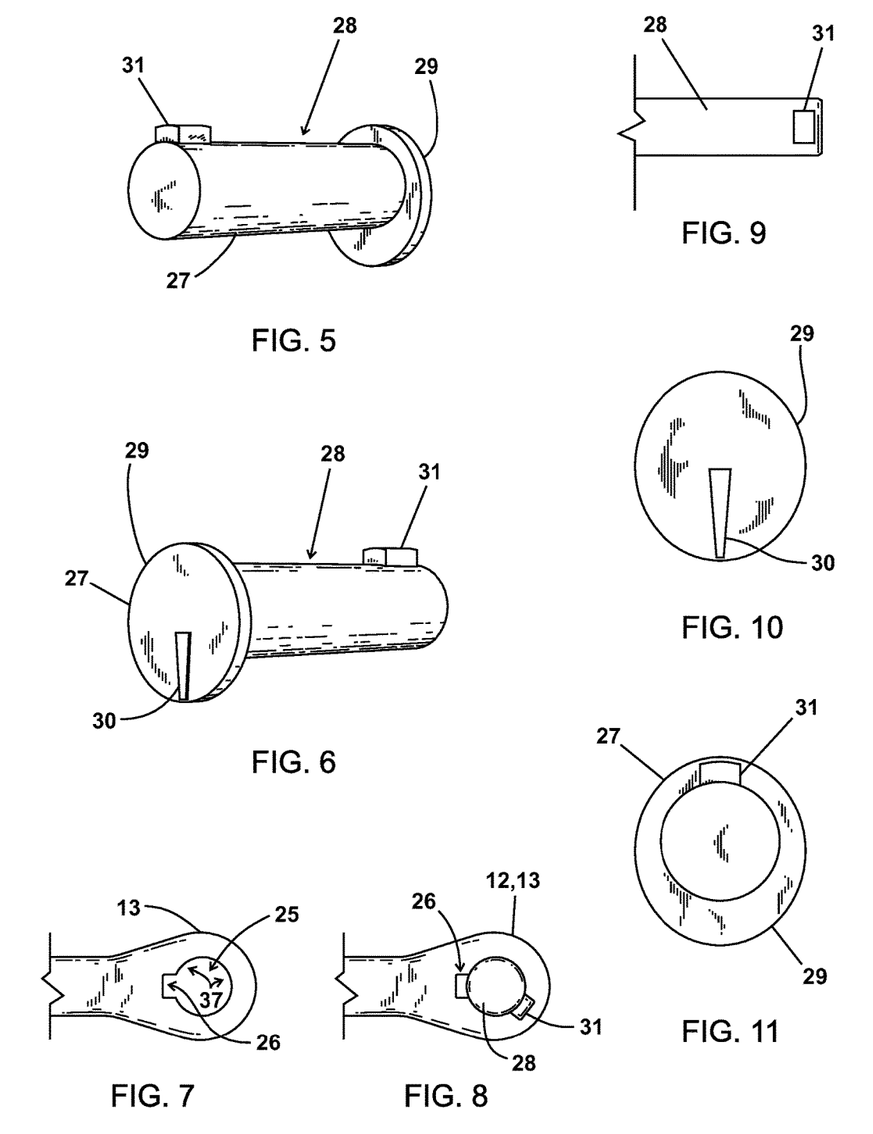
FIGS. 5 and 6 are perspective views of a pin of a preferred embodiment of the apparatus of the present invention.
FIG. 7 is a partial end view showing a pin in a lug with the projection aligned with the groove.
FIG. 8 is a partial end view showing a pin in a lug with the projection not aligned with the groove.
FIG. 9 is a partial top view of a pin of a preferred embodiment of the apparatus of the present invention.
FIG. 10 is an end view of a pin showing an indicia on the head of the pin.
FIG. 11 is an end view of the pin showing a projection.

Pin or peg 27 has an enlarged head 29 at one end portion of shaft 28 as seen in for example FIGS. 5 and 6. Head 29 is preferably eccentrically mounted on pin 27 because head 29 allows user control and easier handling of the peg 27 to push or insert into openings 24 and 25 of handle 11 for securing or easy twisting of peg 27 to align peg 27 for easier grasping and removal of peg 27 from handle 11. The opposite end portion of shaft 28 has a radially extending locking projection or locking member 31. Locking member or projection 31 is sized and shaped to pass through each groove 26 of a lug 12 or 13 at lug opening 24, 25 when peg or pin 27 is inserted through both lug openings or channels 24, 25. When fully inserted through both lug openings 24, 25 the head 29 functions as a stop to limit further travel of shaft 28 into the lug openings or channels 24, 25. Once so inserted, the locking member or projection 31 extends beyond the second lug 13 and is now rotatable with shaft 28. In this locking position the head 29 can abut the first lug 12.

Figure 20:
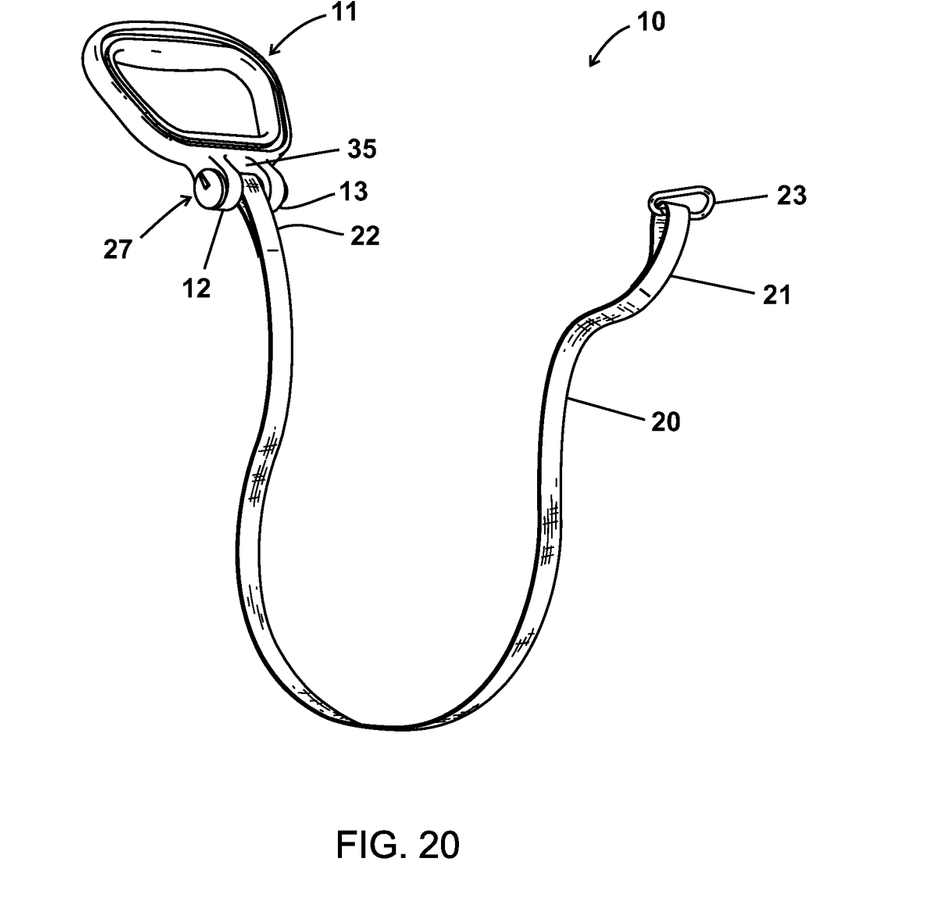
FIG. 20 shows the handle of a preferred embodiment of the present invention attached to for example a nylon webbing strap and a carabiner.
Figure 21:
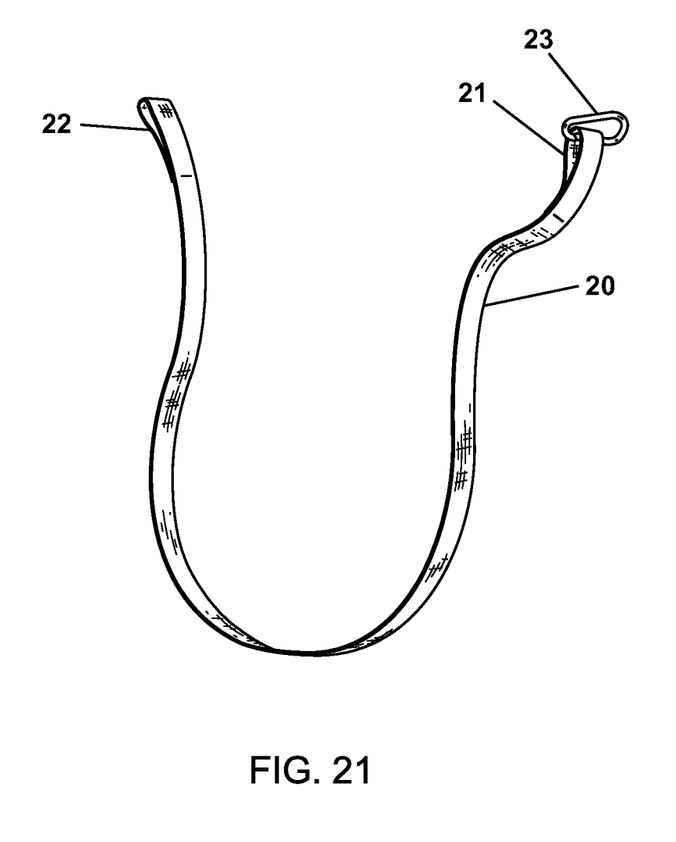
FIG. 21 shows for example a nylon webbing strap and a carabiner before it is attached the handle of a preferred embodiment of the present invention.

Strap 20 has a loop 22 at one end portion that is sized and shaped to fit gap 35 and encircle peg or pin 27 as seen in for example FIG. 20. A user thus places loop 22 in gap 35 prior to inserting peg or pin 27 through first lug 12 at lug opening or channel 24. The peg or pin 27 then passes through loop 22 at gap 35 and then pin or peg 27 passes through second lug 13 opening or channel 25. During this insertion, the locking member or locking projection is aligned with and travels through the groove 26 of each lug 12, 13. Once the projection 31 passes through the second lug 13 at opening or channel 25, the peg or pin 27 is locked into position by rotating head 29 to misalign projection or locking member 31 relative to groove 26 as illustrated in for example FIG. 18. This arrangement enables use of straps 20 of differing lengths and of differing material as selected by a user. Strap 20 as seen in FIG. 20 can provide a loop 21 spaced away from loop 22. Loop 21 can be fitted with any fitting or implement as selected by a user such as a carabiner 23, hook, hook-and-loop material (such as Velcro brand) connector or other connector. FIGS. 6 and 10 show indicia such as an arrow 30 can be provided on head 29 to indicate to a user the position of locking member or locking projection 31 relative to the lugs 12, 13. In the top view of FIG. 9, the locking member or locking projection 31 can have a generally rectangular cross section.

Figure 14:
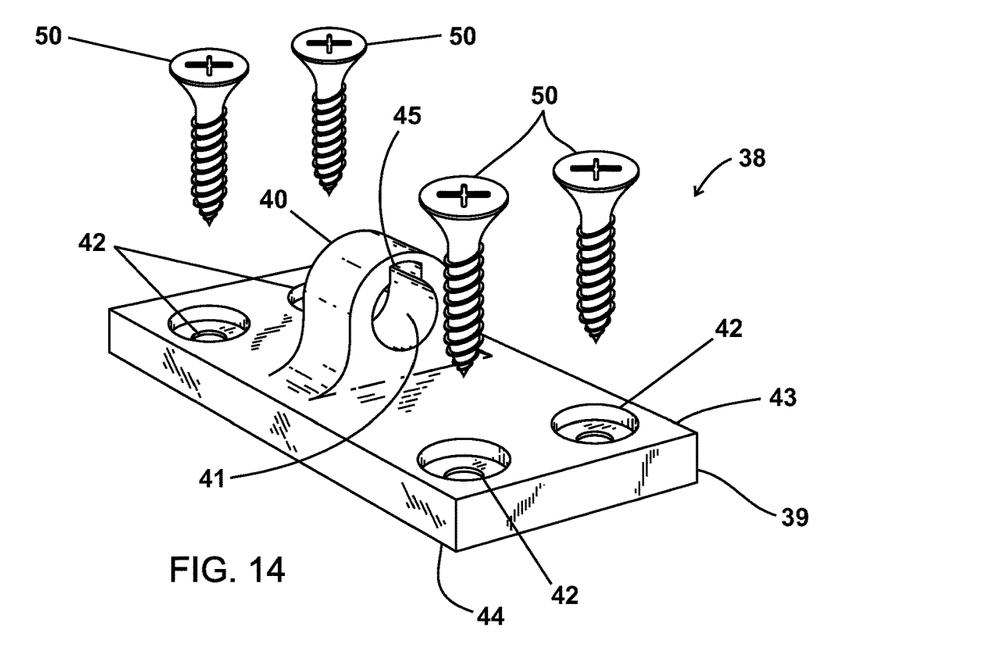
FIG. 14 shows a first fitting for attaching the handle to an object such as a suitcase.

FIG. 14 shows a fitting 38 that can be used with the handle 11 and connecting to its lugs 12, 13. Fitting 38 has a plate such as a rectangular plate 39 with a plate lug 40 extending up from plate 39 upper surface 43. Plate lug 40 has a plate opening or channel 41 that is sized and shaped to receive peg or pin 27. Plate lug opening 41 has plate lug groove 45 that extends radially away from plate lug opening 41. Plate lug groove 45 is sized and shaped to receive locking projection or locking member 31. Plate openings 42 are near the periphery of plate 39 such as at each corner as shown. Each plate opening 42 extends from upper surface 43 to lower surface 44. Fasteners 50 such as bolts or screws (shown as Phillips head screws in the drawings) can be inserted through openings 42 and then secured to an object to be lifted such as a suitcase.

Figure 15:
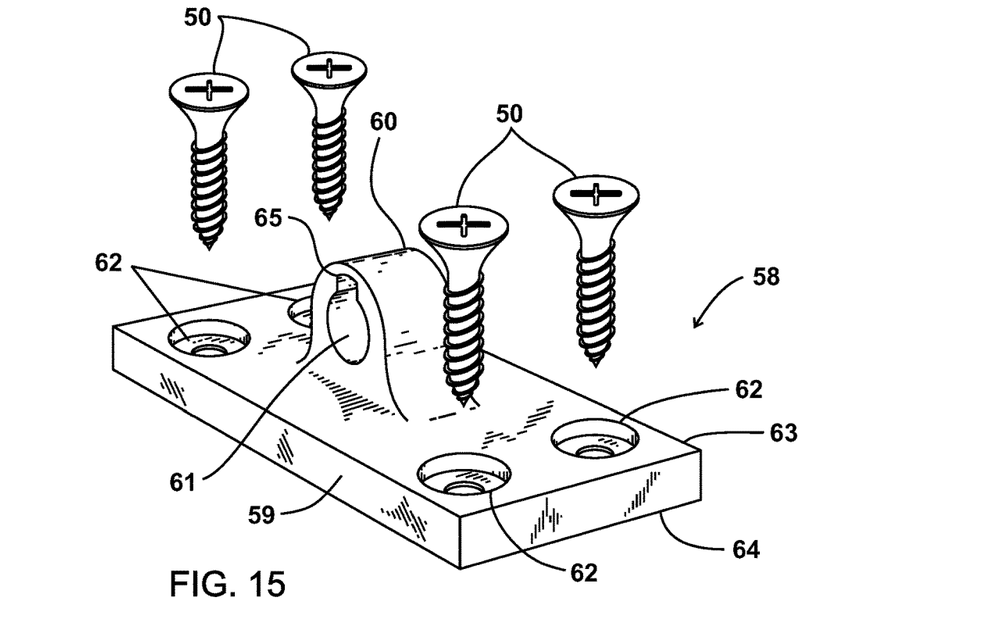
FIG. 15 shows a second fitting for attaching the handle to an object such as a suitcase.

FIG. 15 shows a fitting 58 that can be used with the handle 11 and connected to its lugs 12, 13. Fitting 58 has a plate such as a rectangular plate 59 with a plate lug 60 extending up from plate 59 upper surface 63. Plate lug 60 has a plate opening or channel 61 that is sized and shaped to receive peg or pin 27. Plate lug opening 61 has plate lug groove 65 that extends radially away from plate lug opening 61. Plate lug groove 65 is sized and shaped to receive locking projection or locking member 31. Plate openings 62 are near the periphery of plate 59 such as at each corner as shown. Each plate opening 62 extends from upper surface 63 to lower surface 64. Fasteners 50 such as bolts or screws can be inserted through openings 62 and then secured to an object to be lifted such as a suitcase. Fasteners 50 are shown as Phillips head in the drawings but could be flat head screws, bolts, or other fasteners that will fit in plate peripheral openings 42, 62 in plates 39, 59, respectively. Fasteners 50 can be made of metals (including, but not limited to stainless, bronze, steel, nickel steel, aluminum, titanium), polymers, plastics, ceramics, wood, carbon fiber and other composites, carbon nanotubes and grapheme embedded plastics, concrete, fiberglass reinforced materials (polyester, vinyl, ester, polyurethane, hybrids, epoxy, DCPD, D-LFT), natural fibers, glass reinforced materials, aramid, or HMW HDPE (the HMW HDPE resin can be for example Alathon L4903, L4907, L5005, L5005V, L5906 produced by LyondellBasel Corporation of America).

Figure 22:
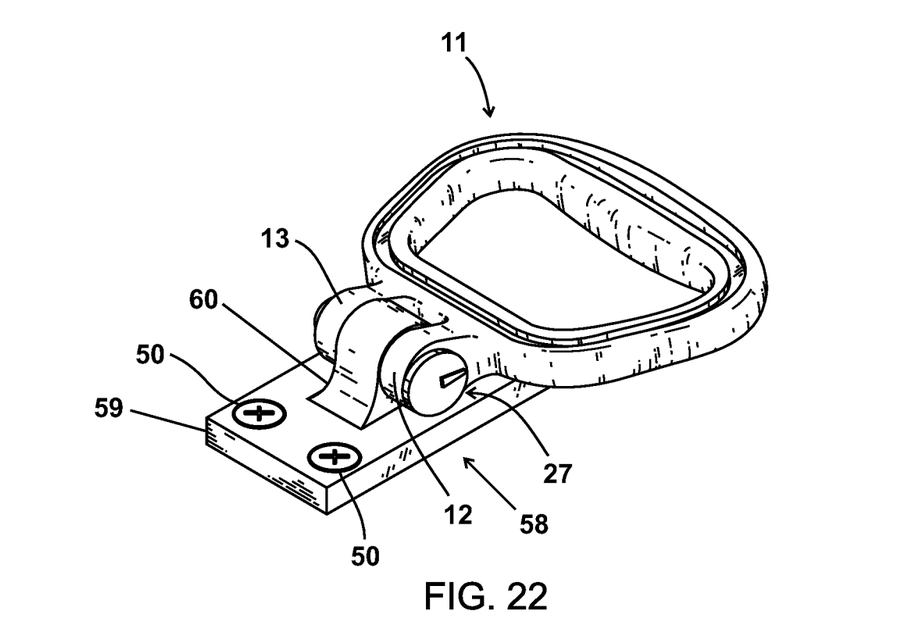
FIGS. 22 and 23 show the handle attached to the fittings of FIGS. 15 and 14, respectively.
Figure 23:
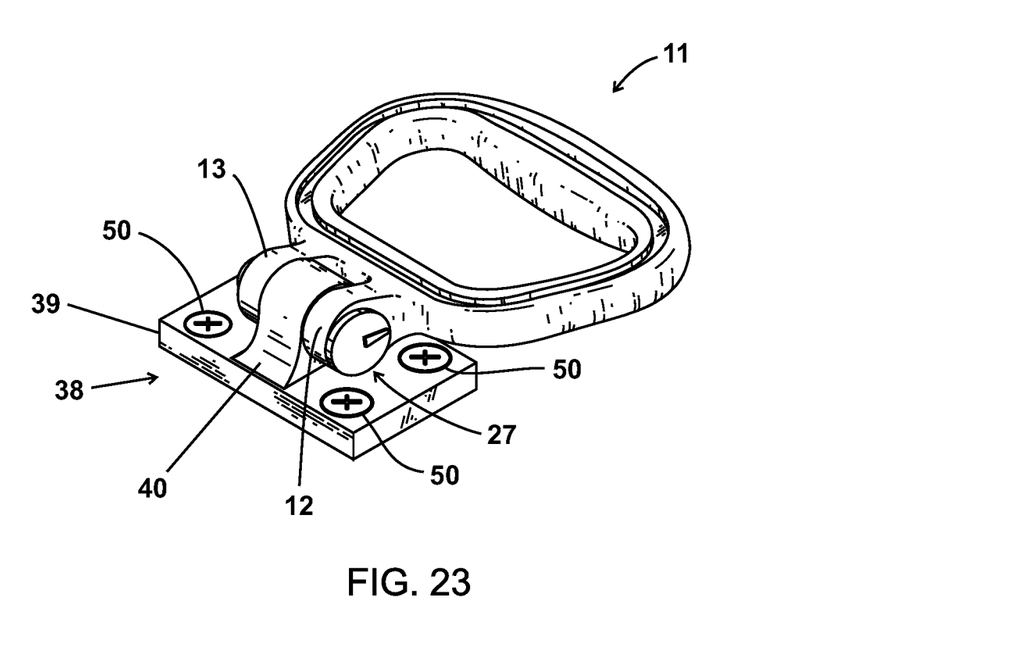
Figure 24:
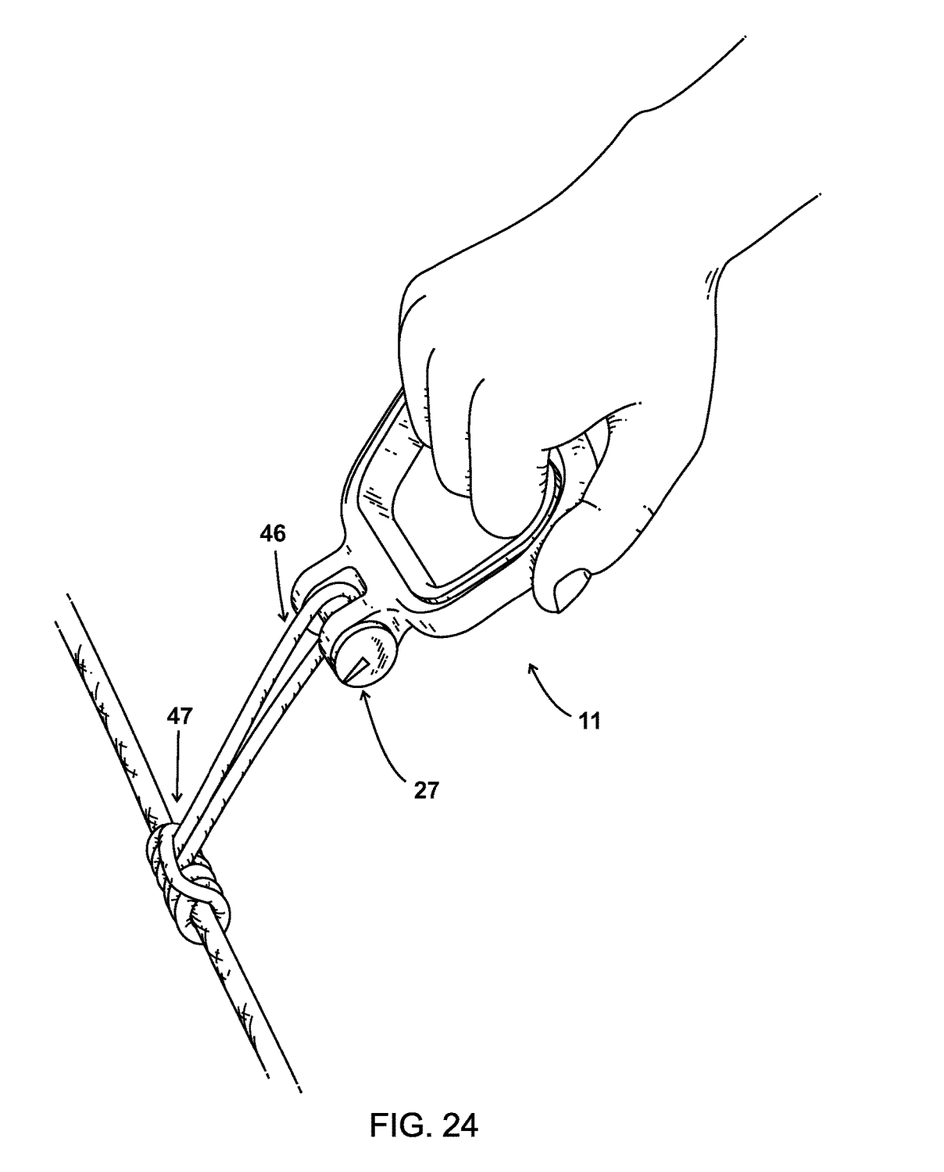
FIG. 24 shows the handle attached to a loop attached to a rope.
Figure 25:
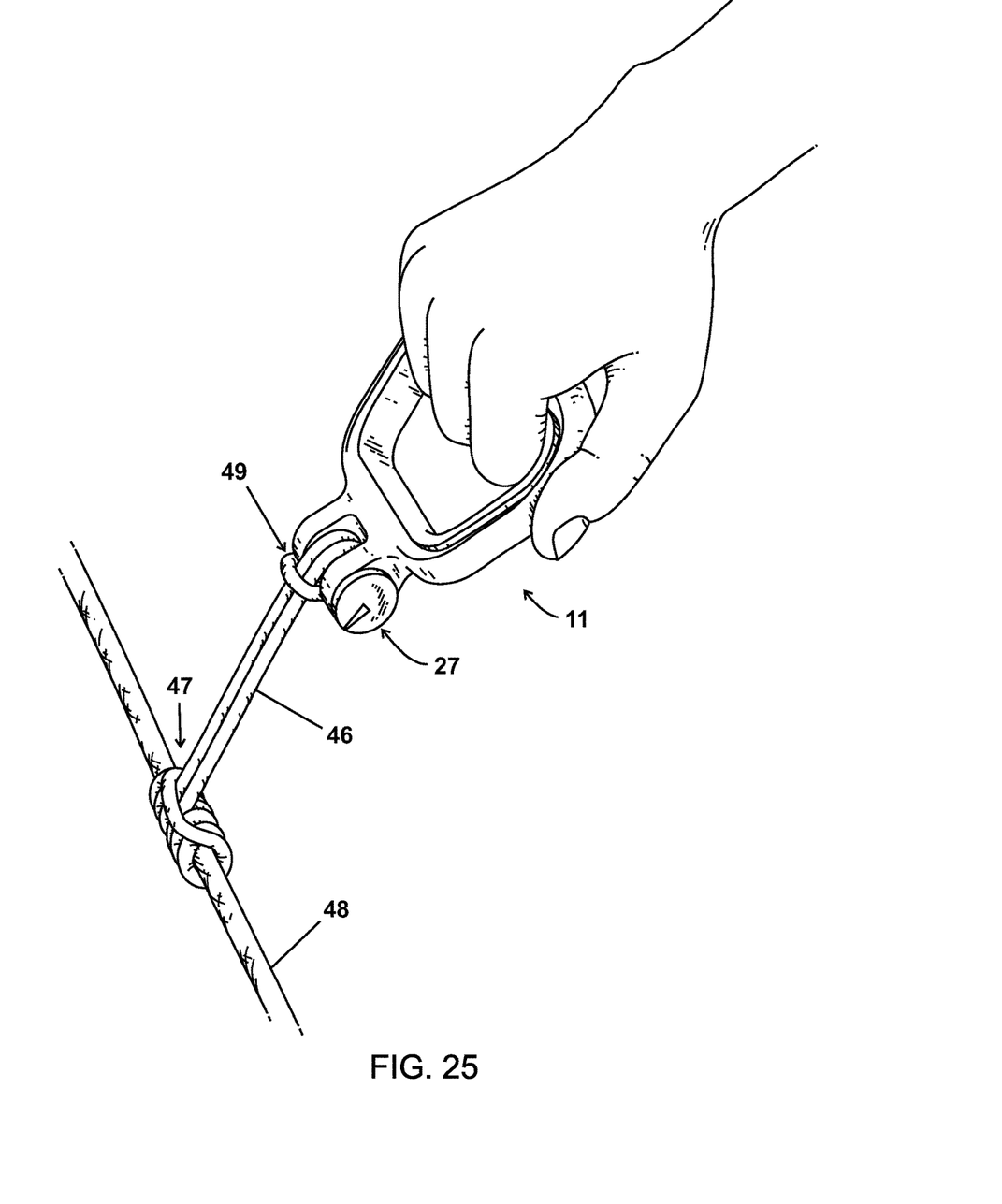
FIG. 25 shows the handle attached to a different loop attached to a rope.

In FIGS. 24 and 25, an endless loop or endless strap 46 can be attached to handle 11 and pin or peg 27 as shown. A knot 47 can be used to secure endless strap or band 46 to an object to be lifted 48. In FIGS. 22 and 23, a second knot can be used to secure endless strap or band 46 to pin or peg 27.

Handle 11 preferably is made of plastic and is ergonomically designed. Preferably peg 27 can be easily inserted, twisted to secure, and easily removed from lugs 12, 13 for use by the end user.

Head 29 is preferably oval shaped to allow for easy grasping and preferably has a noticeable directional arrow 30 design for easy alignment of projection 31 and grooves 26. This allows for easy insertion or removal of peg 27.

Figure 17:
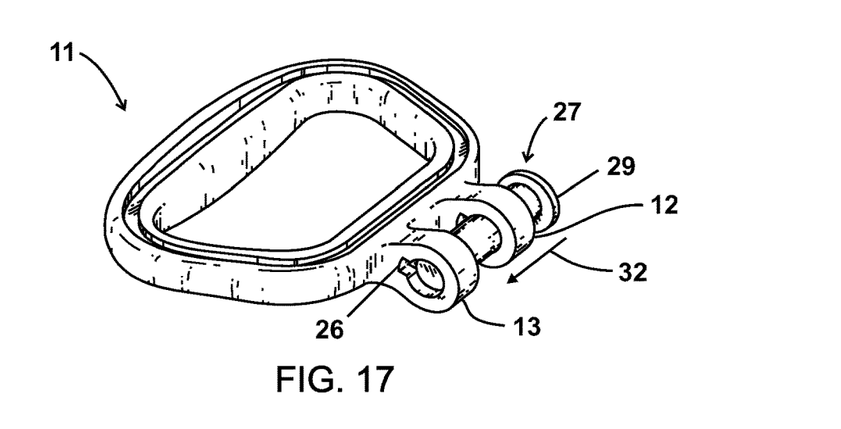
Figure 18:
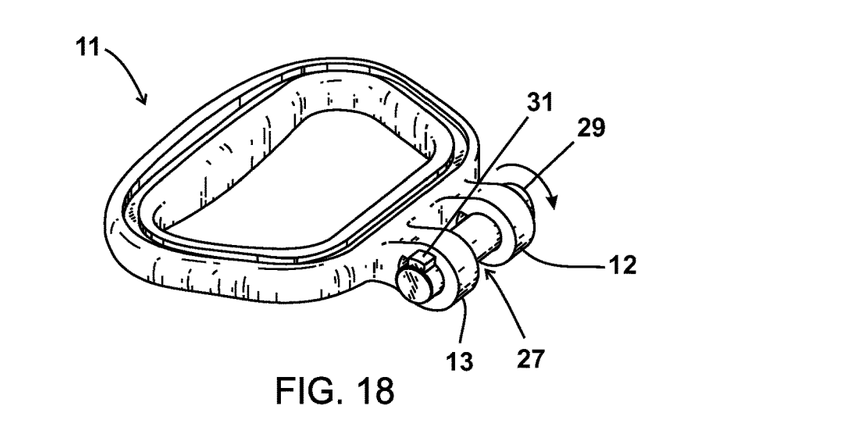

The present invention also includes a method of using the universal handle of the present invention. FIGS. 16-18 show a sequence of a preferred method of the present invention inserting projection 31 into grooves 26 by aligning projection 31 with grooves 26 in lugs 12, 13. Preferably a user can push to insert pin/peg 27 with minimal force. Projection 31 could be turned clockwise or counterclockwise to secure peg 27.

Figure 19:
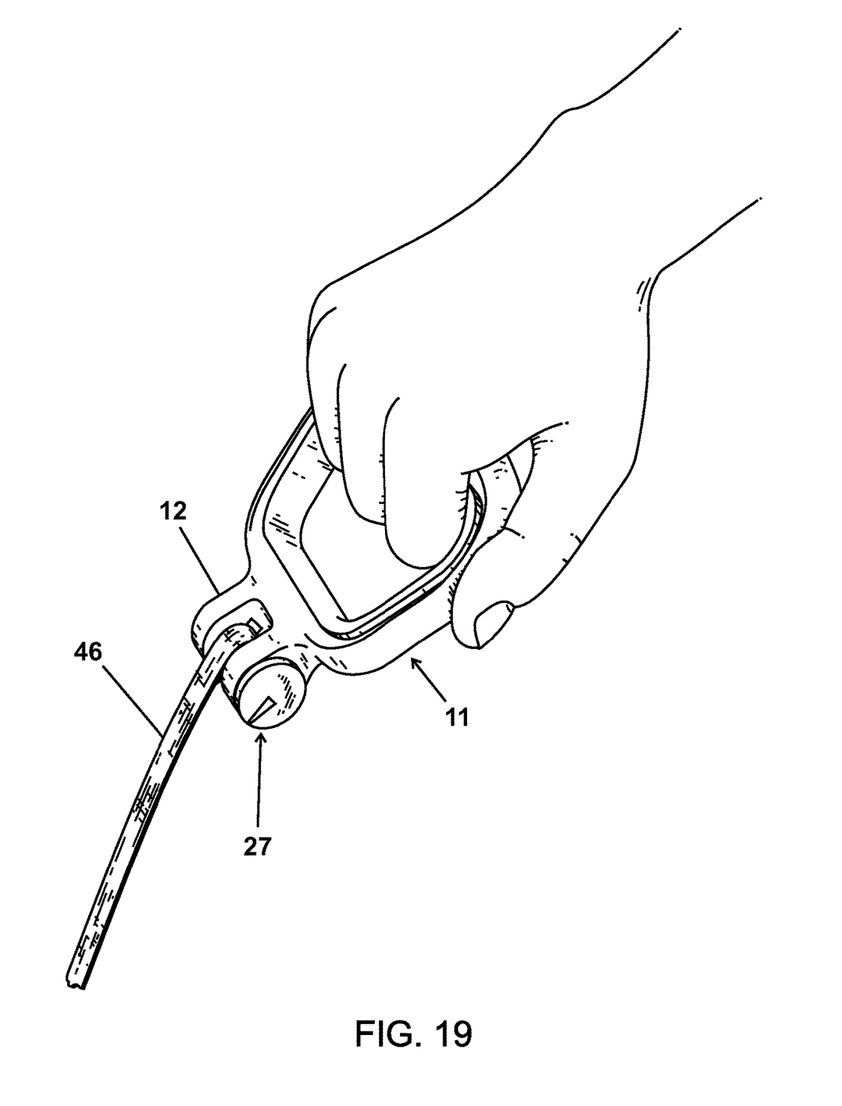
FIG. 19 shows the handle of a preferred embodiment of the present invention attached to for example a nylon webbing strap as an example of one of the uses of a preferred embodiment of the apparatus of the present invention.

FIG. 19 is an illustration of the universal handle apparatus 11 attached to strap 20. Strap 20 preferably has a folded back loop that is fixed after being sewn. Peg 27 would preferably be inserted into the first channel 24 through the strap (or rope, cable, wire etc) and then through the second channel 25 and turned to secure the attachment. This application could be applied, for example, for comfort, leverage, and/or improved ergonomics by the end user when pulling, dragging, carrying, or securing an object.

FIG. 22 is a perspective view of the universal handle 11 and the mounting bracket or fitting 58 as one unit for attaching to an object (ice chest, box, tool chest etc.—not shown) by the end user. FIG. 23 is a perspective view of the universal handle 11 and the mounting bracket or fitting 38 as one unit for attaching to an object (ice chest, box, tool chest etc.—not shown) by the end user. FIGS. 24 and 25 are perspective views of alternate uses or ways of attachment of the universal handle 11 to a cord, webbing or rope. A Prusik Knot 47 can be used to attach to a cord, webbing or rope. Universal handle 11 is preferably attached to the loop ending of the Prusik Knot 47. This attachment preferably allows movement of the position of universal handle 11 along the cord, webbing or rope without the need to remove and reattach universal handle 11. One purpose of this use would be, for example, to attach universal handle 11 to the end loop of the Prusik Knot 47 as an accessory to a dog leash for choking down or reducing the length of the leash for walking, control or training the animal while maintaining a security loop at the end of the leash over the wrist of the user.

An embodiment of the present invention can be described as a handle apparatus including a handle 11 having projections 12, 13 including pin receiving holes 24, 25, a pin 27 received in the pin receiving holes 24, 25, pin 27 having a head 29 mounted on pin 27 and a locking protrusion 31, grooves 26 in the projections 12, 13, for allowing locking protrusion 31 to pass therethrough, wherein pin 27 is locked into place after protrusion 31 passes through grooves 26 in projections 12, 13, and pin 27 is twisted or rotated so that protrusion 31 is not lined up with grooves 26. Preferably, pin head 29 is eccentrically mounted on pin 27 so that head 29 allows easier handling of inserting, locking, unlocking, or removing of peg or pin 27 by the user.

Peg 27 preferably slides in with an insertion force of preferably less than 50 Newtons of pressure (more preferably less than 5 Newtons, and even more preferably at about zero insertion force) and once rotated it preferably requires a force of more than 20 Newtons (more preferably more than 75 Newtons, and even more preferably unremovable to point of breakage or deformity of peg and peg leg) to remove peg once inserted and secured by rotating to misalign projection 31 and grooves 26.

Handle 11 is preferably approximately 5⅜ inch wide, 4¾ inch tall, ¾ thick top hand grasp area that tapers to ½ sides and preferably tapers back to an approximately ¾ inch thick peg legs preferably with ½ inch diameter holes 24, 25 in each lug 12, 13. There is preferably approximately 5¼ inch clearance for hand space that preferably tapers down to 3¼ inch. The peg legs or lugs 12, 13 preferably project downward from the base of handle 11 approximately 1¼ inches and each leg or lug 12, 13 is preferably ½ inch wide and the legs or lugs 12, 13 are preferably approximately ¾ inches apart. There is a preferably approximately ¼ inch channel 26 in the peg legs or lugs 12, 13 to allow for the peg 27 to fit in and lock to handle 11.

Peg 27 is preferably approximate 0.475 inch diameter to easily move through peg leg holes 24, 25. Peg 27 preferably has a head preferably approximately 1.25 inches in diameter, and peg 27 is preferably approximately 2 inches in length. It preferably has a less than ¼ inch molded key part or projection 31 to fit in keyed hole 26 of peg legs 12, 13. The range of sizes of the universal handle and peg could be manufactured for example from 50% of present size to 500% of present size, and relative sizes of the parts could be varied.

Different materials that can be used for the universal handle apparatus of the present invention include: metals (including, but not limited to stainless, bronze, steel, nickel steel, aluminum, titanium), polymers, plastics, ceramics, wood, carbon fiber and other composites, carbon nanotubes and grapheme embedded plastics, concrete, fiberglass reinforced materials (polyester, vinyl, ester, polyurethane, hybrids, epoxy, DCPD, D-LFT), natural fibers, glass reinforced materials, and aramid. The handle apparatus of the present invention can be injected molded material such as HMW HDPE. The HMW HDPE resin can be for example Alathon L4903, L4907, L5005, L5005V, L5906 produced by LyondellBasel Corporation of America.

PARTS LIST

The following is a list of parts suitable for use in the present invention:
Part Number Description
10 handle and strap lifting/pulling apparatus
11 handle
12 lug
13 lug
14 central open area/central opening
15 gripping surface
16 side section
17 side section
18 large section
19 small section
20 strap
21 loop/end
22 loop/end
23 carabiner/hook/fitting
24 lug opening/channel
25 lug opening/channel
26 groove
27 pin/peg
28 shaft/cylindrical shaft
29 head/enlarged diameter end portion
30 arrow/position indicator/indicia
31 locking member/projection 32 arrow
33 lug free end
34 lug free end
35 gap/space
36 cylindrically shaped section
37 cylindrically shaped section
38 fitting
39 plate/rectangular plate
40 plate lug
41 plate lug opening/channel
42 plate peripheral opening
43 plate upper surface
44 plate lower surface
45 plate lug groove
46 endless loop strap/band
47 first knot
48 object to be lifted
49 second knot
50 fastener/screw/bolt/bolted connection
58 fitting
59 plate/rectangular plate
60 plate lug
61 plate lug opening/channel
62 plate peripheral opening
63 plate upper surface
64 plate lower surface
65 plate lug groove All measurements disclosed herein are at standard temperature and pressure, at sea level on Earth, unless indicated otherwise. All materials used are intended to be used in a human being are biocompatible, unless indicated otherwise.

The foregoing embodiments are presented by way of example only; the scope of the present invention is to be limited only by the following claims.

The invention claimed is:

1. A handle apparatus for pulling or lifting a selected object, comprising;
   a) a handle having a first section with a gripping surface, a second section spaced from the first section and side sections that each connect between the first and second sections on opposing sides of a handle central open area;
   b) a pair of lugs mounted on said second section and extending away from said central opening area, said lugs being spaced inwardly of said side sections;
   c) wherein each lug has a lug free end and a lug base joined to said second section;
   d) a gap in between said lugs, said gap extending from one said lug to the other said lug and from the second section to the lug free ends;
   e) each lug having an open ended transverse opening that includes a cylindrical section and a groove extending radially away from said cylindrical section;
   f) a locking pin that is connectable to the lugs by occupying the lug openings in a connected locking position;
   g) said locking pin including a cylindrical shaft with first and second shaft end portions, a head at one shaft end portion and a radial projection on the second shaft end portion;
   h) wherein in said locking position, the locking pin shaft occupies the lug openings and the pin radial projection is positioned externally of the lug openings and is not aligned with a said lug groove; and
   i) a fitting having a connecting portion that encircles the shaft in the locking position.

2. The handle apparatus of claim 1 wherein the shaft has a shaft diameter and the head has a head diameter that is greater than the shaft diameter.

3. The handle apparatus of claim 1 wherein the central open area is generally trapezoidal in shape.

4. The handle apparatus of claim 1 wherein the grooves of the lugs are generally aligned.

5. The handle apparatus of claim 1 wherein the fitting has a plate that is affixable to a selected object to be lifted and wherein the said connecting portion attaches to the plate.

6. The handle apparatus of claim 5 wherein the plate has openings spaced away from the connecting portion and fasteners that enable connection of the plate to a selected object wherein the fasteners occupy the plate openings and attach to the object to be lifted.

7. The handle apparatus of claim 5 wherein the connecting portion is a plate lug that extends from the plate and that fits in between the two lugs of the handle.

8. The handle apparatus of claim 1 wherein each lug opening has a central axis and the central axes of the lugs are aligned.

9. A handle apparatus for pulling or lifting a selected object, comprising;
   a handle having a first section with a gripping surface, a second section spaced from the first section and sides sections that each connect between the first and second sections on opposing sides of a handle central open area;
   a pair of lugs mounted on said second section and extending away from said central opening area, said lugs being spaced inwardly of said side sections;
   wherein each lug has a lug free end and a lug base joined to said second section; a gap in between said lugs, said gap extending from one said lug to the other said lug and from the second section to the lug free ends;
   each lug having an open-ended transverse opening that includes a cylindrical section and a groove extending radially away from said cylindrical section;
   a locking pin that is connectable to the lugs by occupying the lug openings in a connected locking position;
   said locking pin including a cylindrical shaft with first and second shaft end portions, a head at one shaft end portion and a radial projection on the second shaft end portion; and
   wherein in said locking position the locking pin shaft occupies the lug openings and the pin radial projection is positioned externally of the lug openings and is not aligned with a said lug groove.

10. The handle apparatus of claim 9 wherein the shaft has a shaft diameter and the head has a head diameter that is greater than the shaft diameter.

11. The handle apparatus of claim 9 wherein the central open area is generally trapezoidal in shape.

12. The handle apparatus of claim 9 wherein the grooves of the lugs are generally aligned.

13. The handle apparatus of claim 9 further comprising a fitting having a plate that is affixable to a selected object to be lifted and a connection portion that attaches to the plate, the connection portion encircling the shaft in the locking position.

14. The handle apparatus of claim 13 wherein the plate has openings spaced away from the connection portion and fasteners that enable connection of the plate to a selected object wherein the fasteners occupy the plate openings and attach to the object to be lifted.

15. The handle apparatus of claim 13 wherein the connection portion is a plate lug that extends from the plate and that fits in between the two lugs of the handle.

16. The handle apparatus of claim 9 wherein each lug opening has a central axis and the central axes of the lugs are aligned.

17. The handle apparatus of claim 1 wherein the fitting has a plate with a periphery that surrounds the connecting portion.

18. The handle apparatus of claim 13 wherein the fitting comprises a loop in a strap.

19. A handle apparatus including:
   a handle having two projections including pin receiving holes;
   a removable pin received in the pin receiving holes, the pin having a shaft, a head mounted on the shaft and a locking protrusion radially extending from the shaft;
   grooves in the projections for allowing the locking protrusion to pass therethrough; and
   wherein the pin is locked into place after the protrusion passes through the grooves in both projections and the pin is twisted so that the protrusion is not lined up with the grooves.

20. The apparatus of claim 19, wherein the pin head is eccentrically mounted on the shaft.

\* \* \* \* \*